United States Patent
Seger et al.

(10) Patent No.: US 10,379,435 B2
(45) Date of Patent: Aug. 13, 2019

(54) SELF-ORIENTING STROBOSCOPIC ANIMATION SYSTEM

(71) Applicants: Shai Seger, Haifa (IL); Rufus Butler Seder, Arlington, MA (US); Robert Bruce Fuhrer, Chappaqua, NY (US); Gyora Mihaly Pal Benedek, Kiryat Bialik (IL)

(72) Inventors: Shai Seger, Haifa (IL); Rufus Butler Seder, Arlington, MA (US); Robert Bruce Fuhrer, Chappaqua, NY (US); Gyora Mihaly Pal Benedek, Kiryat Bialik (IL)

( * ) Notice: Subject to any disclaimer, the term of this patent is extended or adjusted under 35 U.S.C. 154(b) by 0 days.

(21) Appl. No.: 15/722,491

(22) Filed: Oct. 2, 2017

(65) Prior Publication Data

US 2018/0129129 A1 May 10, 2018

Related U.S. Application Data

(60) Provisional application No. 62/420,339, filed on Nov. 10, 2016.

(51) Int. Cl.
*G02B 25/00* (2006.01)
*G03B 25/00* (2006.01)
(Continued)

(52) U.S. Cl.
CPC .............. *G03B 25/00* (2013.01); *F21S 10/06* (2013.01); *F21S 10/063* (2013.01);
(Continued)

(58) Field of Classification Search
CPC ...... G03B 25/00; G03B 25/02; G03B 21/001; G03B 21/32; G03B 23/105; F21S 10/06;
(Continued)

(56) References Cited

U.S. PATENT DOCUMENTS

RE8,708 E    5/1879   Sibley et al.
D31,654 S    10/1899  Poteet
(Continued)

FOREIGN PATENT DOCUMENTS

GB    2388329        11/2003
KR    20030059785    7/2003

OTHER PUBLICATIONS

Hasbro, Lite-Brite Spider-Man 3 Flash Art Neon Paint Spinner, www.hasbro.com website, Hasbro, Inc., Pawtucket, Rhode Island, USA.

*Primary Examiner* — Bao-Luan Q Le
(74) *Attorney, Agent, or Firm* — O'Connell Law Firm; Thomas P. O'Connell

(57) ABSTRACT

A rotatable stroboscopic animation device with a rotatable base portion and at least one light source. An angular-velocity-dependent flashing system flashes the at least one light source according to a predetermined flash mode dependent on the angular velocity of the base portion to produce coherent, automatic stroboscopic animation of images retained by the base portion. The flashing system can comprise an angular velocity determination system in cooperation with an illumination system. Angular velocity can be determined by an orienting system, such as a compass, in combination with a sampling system, a gyroscope, or a rotational sensor. A flash mode selection mechanism, which can be manual or automatic, permits a selection of a flash mode from among a plurality of flash modes. A manual flash mode selection mechanism can be formed by relatively pivotable upper and lower disks of the base portion. Animation disks can have indications of predetermined flash modes.

51 Claims, 10 Drawing Sheets

(51) Int. Cl.

| | |
|---|---|
| *G03B 23/10* | (2006.01) |
| *G02B 27/06* | (2006.01) |
| *G03B 21/32* | (2006.01) |
| *H05B 37/02* | (2006.01) |
| *F21S 10/06* | (2006.01) |
| *G03B 21/00* | (2006.01) |
| *G01C 19/42* | (2006.01) |
| *G03B 25/02* | (2006.01) |

(52) U.S. Cl.
CPC ............ *F21S 10/066* (2013.01); *G02B 27/06* (2013.01); *G03B 21/001* (2013.01); *G03B 21/32* (2013.01); *G03B 23/105* (2013.01); *H05B 37/0227* (2013.01); *H05B 37/0281* (2013.01); *G01C 19/42* (2013.01); *G03B 25/02* (2013.01); *Y02B 20/42* (2013.01)

(58) Field of Classification Search
CPC ...... F21S 10/063; F21S 10/066; G01C 19/42; G02B 27/06; H05B 37/0227; H05B 37/0281

See application file for complete search history.

(56) References Cited

U.S. PATENT DOCUMENTS

| | | | |
|---|---|---|---|
| 1,014,365 A | 1/1912 | Bourgin | |
| D63,891 S | 2/1924 | Flauder | |
| 1,503,006 A | 7/1924 | Rause | |
| 3,694,062 A | 9/1972 | Koenig | |
| 3,700,880 A | 10/1972 | Smith | |
| 3,783,550 A | 1/1974 | Andrews | |
| 3,951,529 A | 4/1976 | Gandia | |
| 4,085,932 A | 4/1978 | Hamano | |
| 4,200,283 A | 4/1980 | Andrews et al. | |
| 4,307,528 A | 12/1981 | Dewees et al. | |
| 4,470,044 A | 9/1984 | Bell | |
| 5,007,877 A | 4/1991 | Watson | |
| 5,041,947 A * | 8/1991 | Yuen ............... | F21S 10/06 345/31 |
| 5,135,425 A | 8/1992 | Andrews et al. | |
| 5,190,491 A | 3/1993 | Connelly | |
| 5,406,300 A | 4/1995 | Tokimoto et al. | |
| 5,760,874 A * | 6/1998 | Rudnick ............ | G02B 27/06 352/101 |
| 5,791,966 A | 8/1998 | Capps et al. | |
| 5,870,170 A * | 2/1999 | Pope ................. | G03B 25/00 352/101 |
| 5,905,564 A * | 5/1999 | Long ................. | G03B 25/00 352/101 |
| 6,097,468 A * | 8/2000 | Muehlenhard ...... | G03B 25/00 352/101 |
| 6,270,391 B1 | 8/2001 | Emilsson | |
| 6,325,690 B1 | 12/2001 | Nelson | |
| 6,549,503 B2 * | 4/2003 | Matos ............... | G11B 31/02 720/600 |
| 6,623,405 B2 | 9/2003 | Chuang et al. | |
| 6,647,651 B2 | 11/2003 | Cutright | |
| 7,037,169 B2 | 5/2006 | Benedek et al. | |
| 7,106,676 B2 * | 9/2006 | Matos ............... | G11B 17/051 369/275.5 |
| 7,940,370 B2 * | 5/2011 | Barnett ............. | G03B 25/00 352/101 |
| 7,940,371 B2 * | 5/2011 | Barnett ............. | G03B 25/00 352/101 |
| 8,139,197 B2 * | 3/2012 | Barnett ............. | G03B 25/00 352/101 |
| 8,373,842 B1 * | 2/2013 | Seder ............... | G03B 25/00 352/101 |
| 8,482,714 B1 * | 7/2013 | Seder ............... | G09F 19/12 352/87 |
| 9,170,479 B1 * | 10/2015 | Kosakura ......... | G03B 23/10 |
| 9,488,903 B2 * | 11/2016 | Veras de Souza .... | G03B 25/00 |
| 9,747,944 B2 * | 8/2017 | Zamir .............. | G09F 19/12 |
| 2002/0150015 A1 * | 10/2002 | Matos ............... | G11B 31/02 369/53.1 |
| 2003/0048417 A1 * | 3/2003 | Rudnick ........... | G03B 25/00 352/101 |
| 2003/0095235 A1 * | 5/2003 | Tsai ................. | G03B 25/00 352/99 |
| 2003/0223042 A1 * | 12/2003 | Rudnick ........... | G03B 25/00 352/101 |
| 2004/0004828 A1 * | 1/2004 | Chernick .......... | F21S 10/00 362/35 |
| 2004/0047617 A1 * | 3/2004 | Matos ............... | G11B 23/40 386/358 |
| 2004/0136293 A1 * | 7/2004 | Matos ............... | G11B 17/051 369/53.21 |
| 2007/0176851 A1 * | 8/2007 | Willey ............. | G02B 26/101 345/32 |
| 2008/0129963 A1 * | 6/2008 | Hohl ............... | G03B 21/50 352/2 |
| 2010/0053557 A1 * | 3/2010 | Barnett ............. | G03B 25/00 352/101 |
| 2010/0103333 A1 * | 4/2010 | Chang .............. | H04N 13/302 349/15 |
| 2010/0201949 A1 * | 8/2010 | Barnett ............. | G03B 25/00 352/101 |
| 2011/0286065 A1 * | 11/2011 | Barnett ............. | G03B 25/00 359/22 |
| 2013/0201316 A1 * | 8/2013 | Binder ............. | H04L 67/12 348/77 |
| 2016/0295156 A1 * | 10/2016 | Zamir .............. | G09F 19/12 |

* cited by examiner

SELF-ORIENTING STROBOSCOPIC ANIMATION SYSTEM

RELATED APPLICATION

This application claims priority to Provisional Application No. 62/420,339, filed Nov. 10, 2016, which is incorporated by reference.

FIELD OF THE INVENTION

The present invention relates generally to animated display devices. More particularly, disclosed herein is a self-contained, self-orienting, and self-strobing rotatable animation device.

BACKGROUND OF THE INVENTION

The word "Strobe" is derived from the Greek word strobos, which translates into English as "act of whirling." Strobing or whirling animation toys and devices were first invented over 175 years ago wherein a rapid succession of individual images were extracted from a spinning printed disk or drum thereby creating the visual illusion of realistic motion. Some are still in use today. The method of image extraction in these devices is customarily achieved either by viewing the whirling images through sweeping slots or by illuminating the whirling images with synchronized light flashes. The methods are alike in that they create the illusion of motion by visually "freezing" the whirling, blurring images one by one, revealing each image as clear and distinct for a fleeting moment before replacing that image with the next.

In 1830, Belgian physicist Joseph Plateau invented the Phenakistoscope, a radially-slotted disk with a succession of drawings arranged concentrically around its perimeter. The drawings appear to come to life and move when the disk is whirled on its axis by a handle and viewed in a mirror through the slots. Ten years later, in 1840, British scientist William Horner disclosed an improved slot animation toy that is referred to as a Zoetrope. The Zoetrope has a slotted drum with images or figures disposed therein such that the images or figures can be viewed through the slots. The images on the paper strips appeared to come to life and move when viewed directly through the slots as the drum is whirled on its pivoting axis. The Praxinoscope was invented in approximately 1877 by Charles-Émile Reynaud. As with the Zoetrope, a series of images is typically placed around the inner surface of a spinning cylinder. However, the narrow viewing slits of the Zoetrope are replaced with outwardly facing mirrors on a central hub. When the cylinder is rotated, the reflections of the images appear in rapid succession thereby producing the illusion of motion.

In the Phenakistoscope, the Zoetrope, and the Praxinoscope, there is usually a direct correlation between the number of drawings and the number of slots: 12 drawings for 12 slots, for example. With that, the subjects appear to maintain their relative location on the drum or disk while animating. Sometimes, such as by providing one more or one less figure than the number of slots or mirrors, the animating subjects can be made to appear to progress directionally as they animate thereby appearing to traverse around the disk or drum. In these devices, one complete animation cycle containing all of the figures is always completed in one full rotation of the whirling image device. Therefore, it behooves the artist to design looping animation cycles, such as a horse galloping, that appear natural when played repeatedly and continuously.

In 1930, MIT scientist Harold Edgerton advanced the art of stroboscopic animation by substituting an adjustable-rate flashing light, now referred to as a strobe light, trained on motorized whirling disks and drums with sequential images disposed thereon. This eliminated the need to peer through slots or look through mirrors and permitted free viewing of the animations for the first time. This method also dramatically expanded the range of animations that could be presented as the flash rate could easily be tuned to differently-designed whirling image configurations and devices, including those containing different numbers of animated drawings. In other words, the light could be made to flash 12 times per revolution of a whirling image device imprinted with 12 consecutive drawings, then adjusted to flash 13 times per revolution to make the image travel in one direction, then adjusted to flash 11 times per each revolution to make the image travel in the other direction. A different animation strip with 16 drawings could then be substituted, and the strobe light could then be adjusted to flash, for example, at the rate of 16 times per revolution.

Since the development of stroboscopic animation, a number of scientists and artists, including one of the present inventors, have devised strobe-lit animation devices and displays operative under these principles. In such devices and displays, a rotatable image device can be rotated by a motor at a constant or varying speed. Alternatively, it may be freely spun by hand so that it decreases in speed as it naturally slows to a stop.

In every such strobe-lit animation device, two elements have been required to achieve animation: 1) a rotating image device and 2) synchronization of the strobe light, such as with a separate, stationary referencing unit that cooperates with the whirling image device to produce synchronization. In a motorized rotatable image device, animation may be achieved by a physical electro-mechanical tether between these two elements. In a freely hand-spun device, these two elements may communicate wirelessly, such as through radio, magnets, or infra-red signals. Lacking any communication between the two, a manually- adjustable strobe light must be trained on the rotating image device to achieve animation.

The practiced user will appreciate that a hand-spun rotatable image device affords more user participation and thus more enjoyment than a motorized one. Further, as the rotating velocity of a hand-spun device naturally slows down along with the synchronized strobe light flash frequency, the progressive slowing in the animation itself is more entrancing than wherein it is maintained at a monotonous, constant speed. For example, when initially hand-spun, the device might present the animation of a furiously galloping horse. Then, as the whirling device slows, the horse's animation slows as well, presenting a more natural, relaxed, and realistic cadence of gallop, progressing to slow motion and finally stopping.

The resulting animations in these devices are delightful to view. Yet, without exception, the stroboscopic animation devices themselves are ungainly and difficult to employ because they invariably require the interaction of the two elements described above: the rotating image device and a separate, synchronized strobe light, typically in the form of a separate, stationary referencing unit. A self-contained, self-orienting, and self-strobing rotatable animation device would, therefore, represent a significant advance in the art.

The present inventors, each accomplished in the world of inventing and in relation to animation devices in particular, are uniquely situated to appreciate the challenges involved in devising of such an animation device and in conceiving of the necessary structural and operational details of a functional self-contained, self-orienting, self-strobing rotatable animation device. With U.S. Pat. No. 7,037,169 to Benedek et al. for a Rotating Toy with Rotation Measurement Means, a plurality of the present inventors disclosed a manually rotatable, self-orienting device that, simply described, utilizes an internal earth magnet compassing system within a spinning top to determine the North/South/East/West orientation of the top as it spins. This information is used to cause a spinning array of LEDs to paint stationary images of letters and numbers in space. Moreover, a co-inventor herein invented the Stroboscopic Animation System of U.S. Pat. No. 8,482,714. There, realistic animations are realized by employing a manually rotated top with interchangeable printed paper animation disks in combination with a separate, manually-adjustable flashing strobe light.

The present inventors therefore recognized that there has been a long-felt need for a completely self-contained, self-orienting, self-strobing, manually rotatable stroboscopic image animation device. Because such a device would be wholly free of dependence upon any external devices, including an external referencing device, it could be employed to the enjoyment of the user with unparalleled ease. In appreciating the foregoing need, the inventors comprehended that such a manually rotatable animation device would need to be North/South/East/West self-orienting and that it would need to exploit the acquired information to synchronize strobe lighting built into the device itself. Further, to accommodate a wide range of different animated subjects, the strobe light's flash rate mode would need to be adjustable, either automatically or by manual selection by the user.

SUMMARY OF THE INVENTION

Employing their individual and collective knowledge and expertise, the present inventors thus set forth with the basic object of providing a completely self-contained, self-orienting, self-strobing, rotatable stroboscopic animation device.

An underlying object of the invention is to provide a stroboscopic animation device that permits simplified use and enjoyment by providing a self-orienting system and thereby avoiding dependence on an external referencing or other device.

A related object of the invention is to provide a manually rotatable animation device that is rotationally self-orienting and capable of exploiting the self-orienting information to synchronize strobe lights built into the body of the animation device.

Another object of the invention is to provide such a rotatable animation device with adjustable stroboscopic light frequency, whether manually, automatically, or selectively manual or automatic to permit, among other things, animation of a wide range of different subjects.

These and further objects and advantages of embodiments of the invention will become obvious not only to one who reviews the present specification and drawings but also to one who has an opportunity to make use of a embodiment of the self-orienting rotatable stroboscopic animation device disclosed herein. It will be appreciated, however, that, although the accomplishment of each of the foregoing objects in a single embodiment of the invention may be possible and indeed preferred, not all embodiments will seek or need to accomplish each and every potential object and advantage. Nonetheless, all such embodiments should be considered within the scope of the invention.

In carrying forth one or more objects of the invention, an embodiment of the rotatable stroboscopic animation device is founded on a rotatable base portion that can be rotated at an angular velocity. A plurality of light sources are retained to illuminate the base portion, such as on a concentric hub. An angular-velocity-dependent flashing system automatically flashes the light sources according to a predetermined flash mode of the plurality of light sources. The flashing of the light sources in the predetermined flash mode is dependent on the angular velocity of the base portion. The angular-velocity dependent-flashing system can be formed by an angular velocity determination system in cooperation with an illumination system that together operate to flash the light sources in the predetermined flash mode dependent on the angular velocity determined by the angular velocity determination system.

The angular velocity determination system can, by way of example, comprise an orienting system in combination with a sampling system. Such may be the case, for instance, in relation to an animation device with a base portion that is freely rotatable on an external support surface, such as by rotating on a protuberance extending concentrically from the base portion. In such constructions, the orienting system can be operative to provide orientational indications regarding the orientation of the base portion, and the sampling system can be operative to sample orientational indications from the orienting system periodically and, based on periodically-obtained orientational indications, to determine the angular velocity of the base portion. The sampling system could be a microcontroller.

Contemplated embodiments of the rotatable animation device can employ a compass as the orienting system. The compass provides orientational indications of North/South/East/West orientation of the base portion. The sampling system can then calculate the angular velocity of the base portion based on differences in the orientational indications provided by the orienting system over pre-determined sampling periods.

Other embodiments of the rotatable animation device can employ a gyroscope as the angular velocity determination system. The gyroscope could, for example, be a MEMS (microelectromechanical system) gyroscope.

It is further possible for the base portion to be rotatable about an axis member. The axis member can be non-rotating while the base portion rotates therearound. In those embodiments, the angular velocity determination system can determine the angular velocity of the base portion in relation to the axis member. For instance, a sensor could be retained by the base portion or the axis member, and a reference for being sensed by the sensor can be retained by the other of the base portion and the axis member.

As taught herein, each flash mode can comprise a predetermined number of flashes of the light sources corresponding to a predetermined number of rotations of the base portion. As used herein, such numbers can include fractions of whole numbers. Embodiments of the rotatable animation device can additionally include a flash mode selection mechanism for selecting a flash mode of the plurality of light sources from among a plurality of flash modes. The flash mode selection mechanism could be manual, or it could be automatic, such as based on a sensed predetermined flash mode for a given animation disk or otherwise. Except as the claims are expressly limited, the flash mode selection mechanism should be considered as possibly manual or automatic. In one embodiment, the flash mode selection mechanism comprises a rotary encoder.

In a disclosed manual flash mode selection mechanism, the base portion has an upper disk and a lower disk. The upper disk and the lower disk are relatively pivotable. A rotary encoder operative to select a flash mode from among plural flash modes is adjusted by a relative pivoting between the upper disk and the lower disk.

A hub can project concentrically from the base portion. The light sources can be retained by the hub, such as by a distal portion of the hub. Moreover, an opaque dome can be retained by a distal portion of the hub, and the light sources can be retained in juxtaposition with the dome.

Animation disks, each with a plurality of images thereon, can be selectively retained to rotate with the base portion. The images could be two-dimensional or three-dimensional. Each disk could have an indication retained by the animation disk of a predetermined flash mode for animation of the animation disk. Disks could be coded with predetermined flash mode indications for animation of the animation disk.

In certain practices of the invention, the plurality of images on a given animation disk could be staggered. More particularly, sequential images of a second group of images could be interposed with sequential images of a first group of images. Stroboscopic illumination could cause animation of the first group of images followed by the second group of images in an apparently continuous sequence.

In another embodiment, the rotatable animation device is again founded on a rotatable base portion. The base portion can be rotated at an angular velocity, and a plurality of light sources are again retained to illuminate the base portion. A flashing system flashes the light sources according to a predetermined flash mode of the plurality of light sources. Further, a flash mode selection mechanism selects or permits the selection of a predetermined flash mode of the plurality of light sources from among a plurality of predetermined flash modes.

Such embodiments of the rotatable animation device can be refined by having the flashing system comprise an angular velocity dependent flashing system. That flashing system can flash the light sources according to the predetermined flash mode dependent on the angular velocity of the base portion. Such an angular velocity dependent flashing system can include an angular velocity determination system and an illumination system that cooperate to flash the light sources in the predetermined flash mode dependent on the angular velocity determined by the angular velocity determination system. For example, the angular velocity determination system can take the form of an orienting system in combination with a sampling system as further described herein.

One will appreciate that the foregoing discussion broadly outlines the more important features of the invention merely to enable a better understanding of the detailed description that follows and to instill a better appreciation of the inventors' contribution to the art. Before an embodiment of the invention is explained in detail, it must be made clear that the following details of construction, descriptions of geometry, and illustrations of inventive concepts are mere examples of the many possible manifestations of the invention.

DETAILED DESCRIPTION OF PREFERRED EMBODIMENTS

The self-orienting stroboscopic animation device disclosed herein is subject to a wide variety of embodiments. However, to ensure that one skilled in the art will be able to understand and, in appropriate cases, practice the present invention, certain preferred embodiments of the broader invention revealed herein are described below and shown in the accompanying drawing figures.

Figure 1:
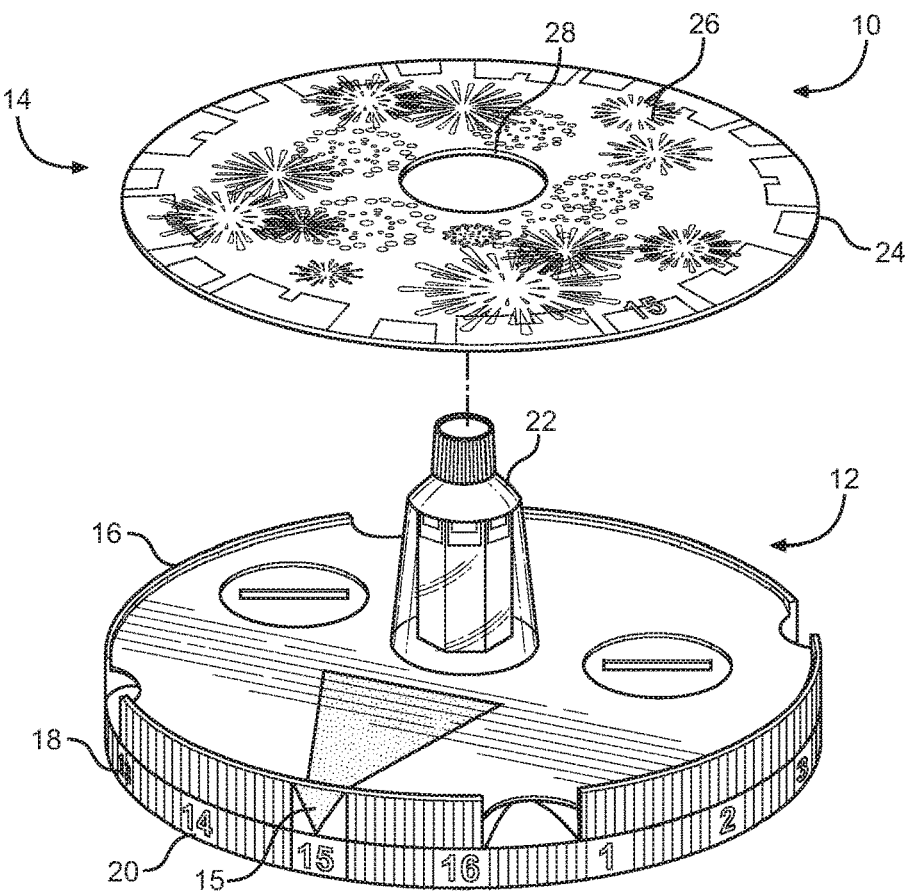
FIG. 1 is a perspective view of a self-orienting stroboscopic animation device according to the invention during assembly.
Figure 2:
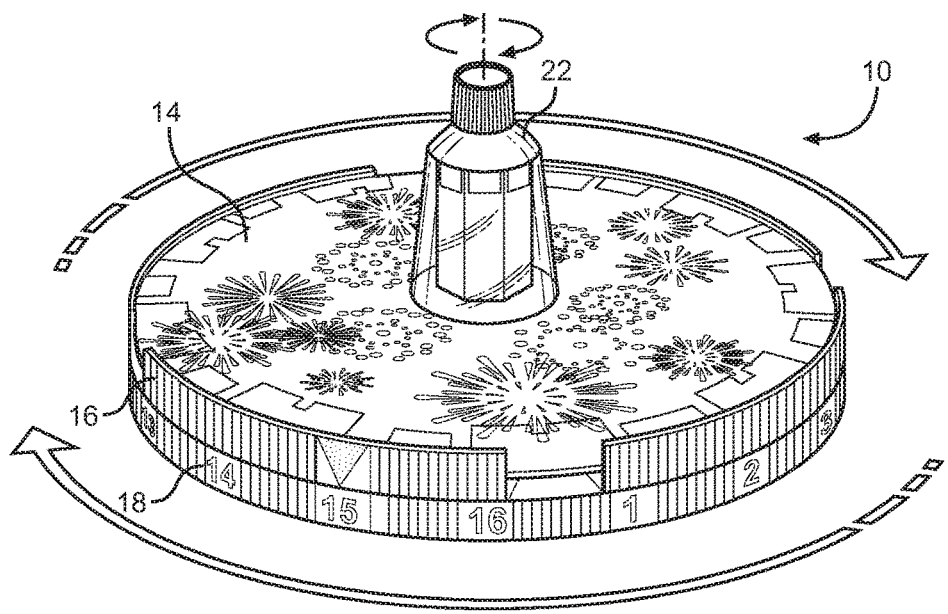
FIG. 2 is a perspective view of the animation device of FIG. 1 in operation.

Looking more particularly to the drawings, a self-contained, self-orienting, self-strobing rotatable animation device according to the disclosed invention is indicated generally at 10 in FIGS. 1 and 2. There, the animation device 10 takes the form of a top with a rotatable base portion 12. The base portion 12 in this embodiment has a first disk 16, which comprises an upper disk 16, retained to rotate concentrically with a second disk 18, which comprises a lower disk 18. As discussed further hereinbelow, the first and second disks 16 and 18 are relatively pivotable.

Figure 3:
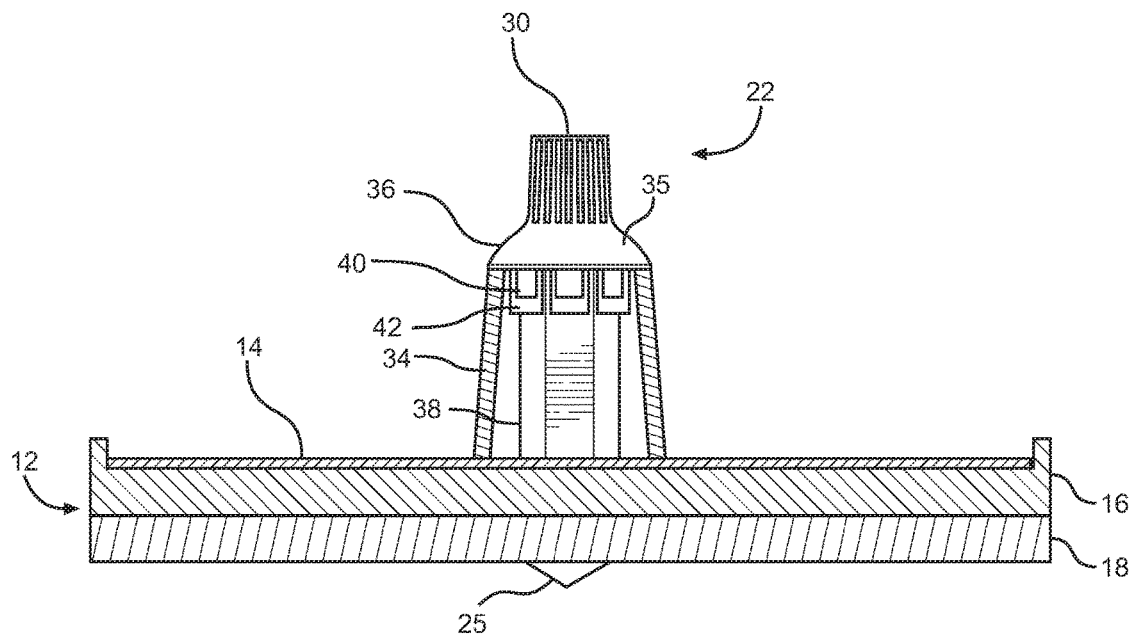
FIG. 3 is a sectional view in side elevation of the animation device.

The base portion 12 is rotatable about an axis of rotation. Where the base portion 12 is freely rotatable about an independent support surface (not shown), the base portion 12 can rotate about the axis of rotation on a concentrically disposed protuberance 25 as FIG. 3 illustrates to establish the axis of rotation. In other contemplated embodiments, the base portion 12 could rotate about a non-rotating base or another fixed axis 64 to establish the axis of rotation as is shown, for example, in FIG. 15.

In the depicted, non-limiting example of FIG. 3, the lower disk 18 has a concentrically disposed protuberance 25 that projects from a lower surface thereof for contacting a support surface. A hub 22 projects concentrically from the base portion 12. Under this construction, the base portion 12 can be manually rotated, such as by a gripping and spinning of the hub 22, to rotate around the axis of rotation of the animation device 10, whether that be around the protuberance 25, around a non-rotating base, or around the fixed axis.

Figure 4:
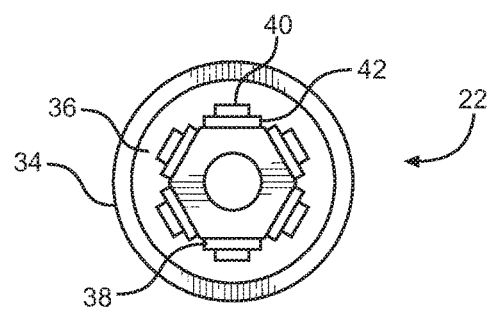
FIG. 4 is a sectional top plan view of a hub portion of the animation device.

The construction of the hub 22 of the embodiment of FIGS. 1 and 2 can be better understood with additional reference to FIGS. 3 and 4. There, the hub 22 can be seen to have a central stem 38 with a knurled knob 30 fixed to rotate therewith. A frusto-conical, transparent shell 34 encases the central stem 38 and is capped by an opaque dome 35 interposed between the shell 34 and the knob 30. The shell 34 houses a plurality of light sources 40. The light sources 40 in this embodiment comprise six LED light sources. It will be understood that fewer or additional light sources 40 could be included except as the invention may be expressly limited by the claims. Indeed, embodiments of the rotatable animation device 10 employing a single light source 40 are possible.

The light sources 40 are disposed in this example to project light outwardly in relation to the axis of rotation and are disposed in immediate juxtaposition to a reflective upper ring 36 that is disposed along a lower portion of the dome 35. The reflective ring 36 is thus disposed immediately above the light sources 40 thereby to direct light evenly down upon the upper surface of the first disk 16 and, additionally or alternatively, an animation disk 24 that may be disposed on the upper surface of the first disk 16 and thus upon the base portion 12. It will be understood that a light source 40 or a plurality of light sources 40 could be otherwise disposed within the scope of the invention. By way of example, and not limitation, light sources 40 could be disposed along an outer periphery of the base portion 12, or the light source or sources 40 could be otherwise disposed.

A plurality of figures or images 26 can be selectively retained to rotate with the base portion 12. For example, images 26 can be applied to the animation disk 24. Alternatively, images 26 can be applied or otherwise retained or displayed directly on the upper surface of the first disk 16. Still further, it would additionally or alternatively be possible for the retained FIGS. 26 to comprise three-dimensional figures that are retained to rotate with the base portion 12, whether by being retained by a disk 24, retained directly by the base portion 12, or otherwise retained. As disclosed herein, animation disks 24 can comprise circular panels of, for instance, paper, card stock, or other material with a concentrically disposed aperture 28 therein for receiving the hub 22. The images or FIGS. 26 can thus be interchanged and illuminated to produce animation as taught herein. It will be further understood that animation disks 24 or other animation members can be otherwise formed, potentially to avoid the inclusion of a central aperture 28.

It is also within the scope of the invention to provide disks 24 with spaces for user-completed portions For example, as described in U.S. Pat. No. 8,482,714, which is incorporated herein by reference, half-tone, wire-frame, outlines, or other animation guides or spaces can be provided for a user to color and complete. Still further, it is contemplated by one of the present co-inventors to provide an online or downloadable application that permits the user, such as through his or her smartphone, digital tablet or computer, to draw his or her own animations, potentially over animation guides.

Within the devised program, a user can complete drawings, such as one by one and in an upright mode, and then instantly create finished disks, such as by printing them out on a printer. All of the drawings can be automatically arranged radially. The correct strobe flash mode number can even be printed directly on the printed substrate. The printouts can then be cut out by or otherwise removed by the user, placed on the base portion 12, and animated as disclosed herein.

The base portion 12 has a low center of gravity. The bottom surface of the base portion 12 is flat and is positioned very close to the protuberance 25 with respect to the axis of rotation of the animation device 10 and is thus close to a surface on which the device 10 is spun. Such a design may be operative to slow the initial manual spin speed of the device 10, such as to an angular momentum of approximately six to ten revolutions per second. It is ideally also operative to lengthen the spin period to between, for example, one to one and one-half minutes, over which time the ever increasing precession slows the angular momentum of the device 10 to two or three revolutions per second and then finally to a stop. Further angular momentum and thus additional spin time may be achieved by incorporating high mass materials for the base portion 12 and other components and, additionally or alternatively, weights.

Figure 16:
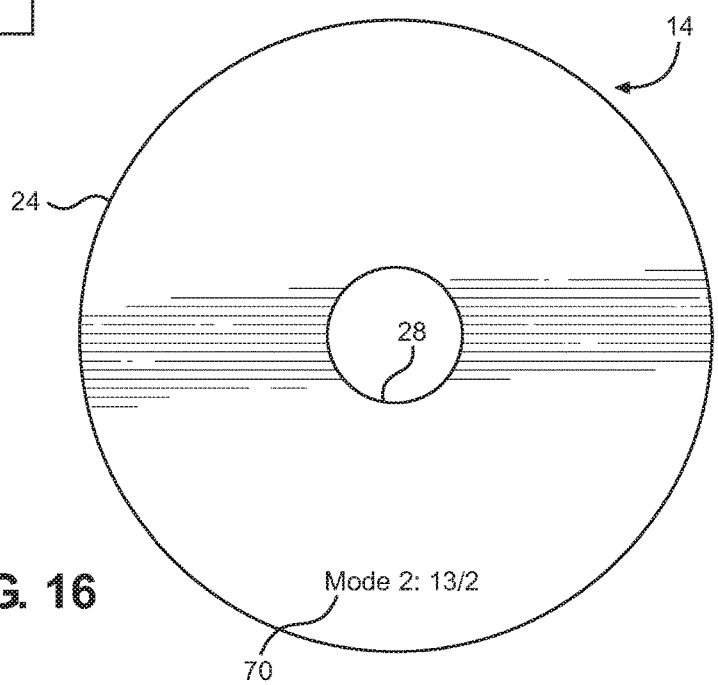
FIG. 16 is a bottom plan view of an animation disk as disclosed herein.

In the embodiment of FIGS. 1 and 2, for example, the animation device 10 incorporates a manual selection mechanism that enables a user to select a flash mode for the light sources 40. For instance, where upper and lower disks 16 and 18 are relatively pivotable, a relative pivoting of either or both disks 16 and 18 can trigger a selection of a light source flash mode from among a plurality of light source flash modes. In this illustrative example, the upper disk 16 has sixteen stop positions in relation to the lower disk 18. An indicator 15 is disposed on the upper disk 16, and sixteen position markers 20 on the lower disk 18 permit selective alignment of the disks 16 and 18 and a selection of a particular flash mode. Animation disks 14 can each be assigned one or more particular flash modes corresponding to one of the plurality of light source flash modes so that a user can program the animation device 10 to exhibit a desired flash mode by a relative pivoting of the disks 16 and 18. An identification 70 can be disposed on the animation disk 14, such as on the underside thereof as FIG. 16 illustrates, to indicate the flash mode under which the animation disk 14 is designed to be animated.

Of course, other flash mode selection mechanisms would occur to one skilled in the art once made aware of the present disclosure. Other examples could, for example, include buttons, sliding switches, and any other flash mode selection mechanism. Further, instead of a manually selectable flash mode selection mechanism, it would be possible to have an automatic flash mode selection mechanism. By way of example, each animation disk 14 could be coded. One coded animation disk 14 could, for instance, have a differently-keyed indentation designed to interlock with and slide a mechanical lever on the base portion 12 to a corresponding position when the disk 14 is placed on the base portion 12. In another possible embodiment, printed or otherwise applied code bars, symbols, radio frequency identification, or other identification could be retained by the disks 14. The identification could trigger the base portion 12 into a corresponding flash mode automatically, such as by an optical or other electronic reader or other sensing of the identification. Each is within the scope of the claimed invention except as may be expressly limited by the claims.

The rotatable animation device 10 incorporates an angular velocity dependent flashing system for automatically and autonomously flashing the light sources 40 according to a predetermined flash mode, such as a selected flash mode, dependent on the angular velocity of the base portion 12. The flashing system can be electronic, mechanical, or a combination of electronic and mechanical. The angular velocity dependent flashing system has an angular velocity determination system and an illumination system that cooperate to flash the light sources 40 in a predetermined flash mode dependent on the angular velocity determined by the angular velocity determination system.

Where the base portion 12 is freely rotatable upon, for example, a support surface, the angular velocity determination system can comprise an orienting system in combination with a sampling system. The orienting system is operative to provide orientational indications regarding the orientation of the base portion 12. The orientational indications can be indications of the immediate orientation of the base portion 12. Additionally or alternatively, the orienting system can be operative to provide orientational indications of rotational changes in the orientation of the base portion 12. The sampling system is operative to sample orientational indications from the orienting system periodically and, based on periodically-obtained orientational indications, to determine the angular velocity of the base portion 12.

The sampling system could comprise electronic circuitry, such as a microcontroller 52 or any other electronic circuitry component or combination of components. Embodiments of the rotatable animation device 10 are contemplated wherein the microcontroller 52 or other electronic circuitry additionally calculates projected angular velocity based on periodically-obtained orientational indications provided by the orienting system.

Figure 6A:
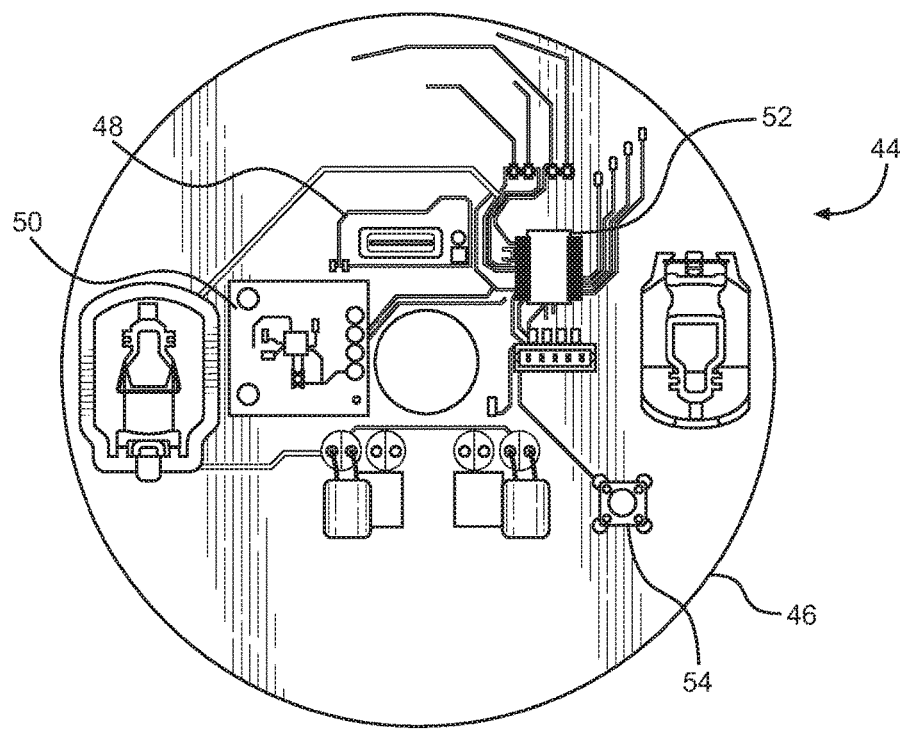
FIG. 6A is a top plan view of a circuit board of an animation device as taught herein.
Figure 6B:
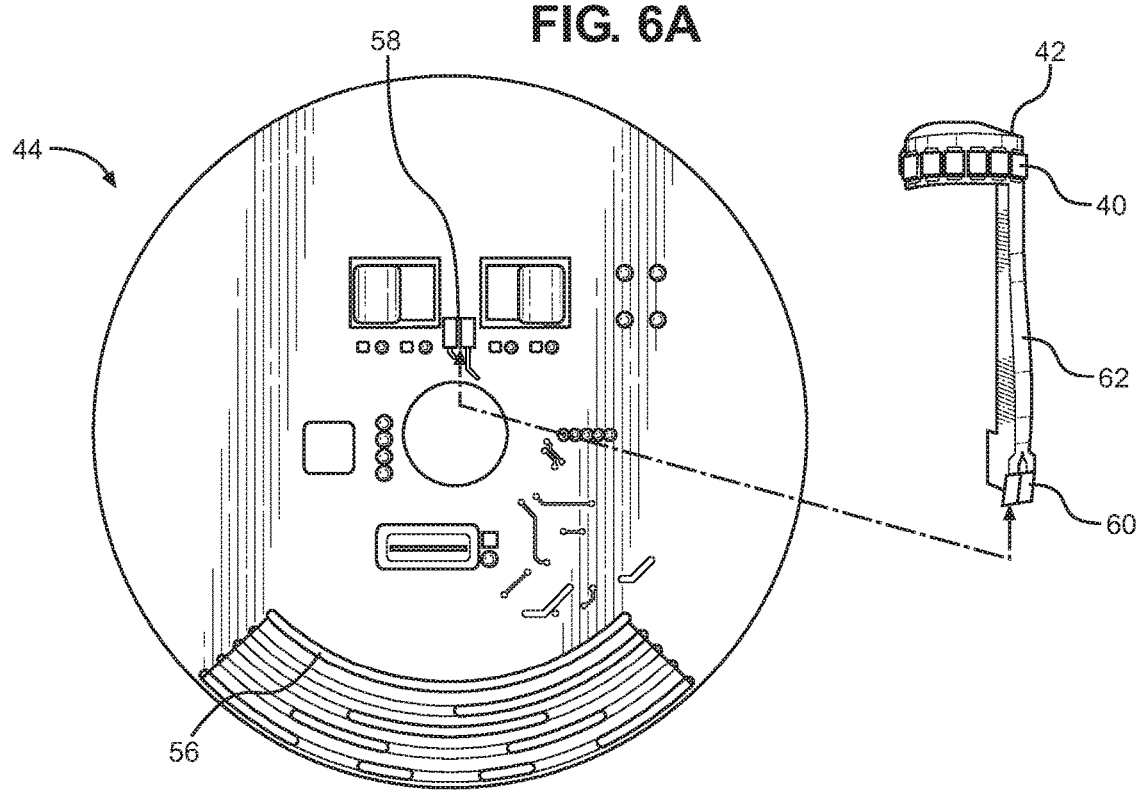
FIG. 6B is a bottom plan view of the circuit board of FIG. 6A.
Figure 8:
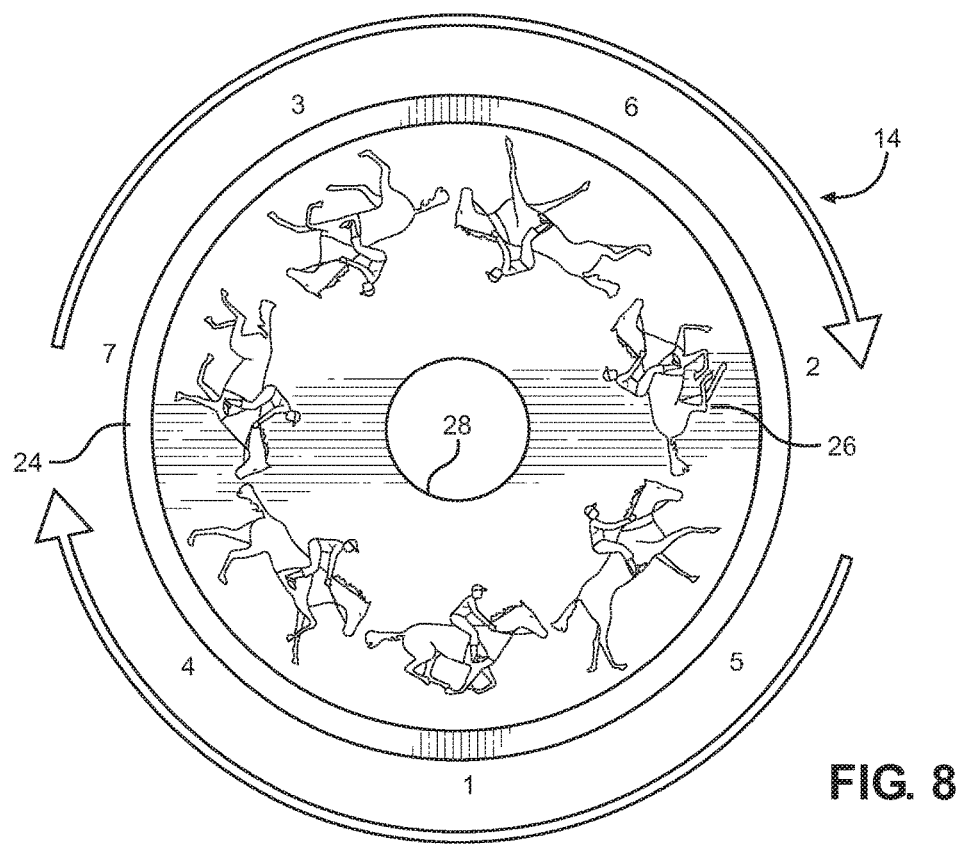
FIG. 8 is a top plan view of an alternative animation disk according to the invention.
Figure 9:
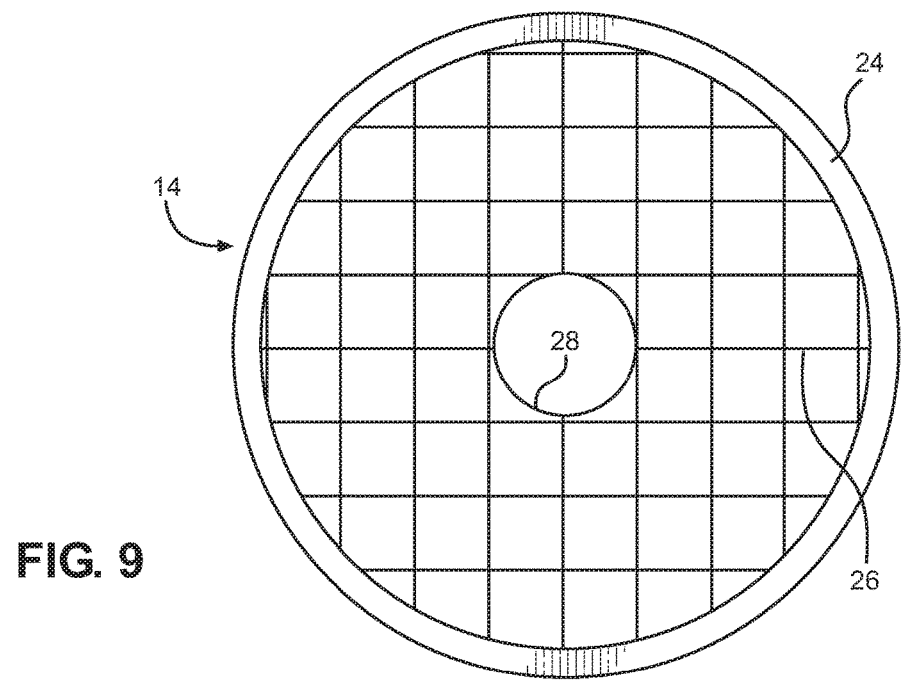
FIG. 9 is a top plan view of an another animation disk according to the invention.

With combined reference to FIGS. 6A and 6B, it can be seen that a disk-shaped printed circuit board 44 is retained by the base portion 12. A compass system 50 operates as an orienting system. The compass system 50 can, for instance, be a self-orienting earth-magnet compass system 50 in combination with an electrical circuit as shown in FIGS. 8 and 9. The compass system 50 can be an Earth inductor compass using electromagnetic induction using the Earth's magnetic field as the induction field. The compass system 50 could be operative with a Hall effect sensor, or the compass system 50 could be an electric compass with a magnetic field sensor sufficiently sensitive to detect the Earth's magnetic field.

The compass system 50 tracks and provides orientational indications of the North/South/East/West orientation of the base portion 12 during rotation of the animation device 10. The microcontroller 52 periodically samples the orientational indications of the North/South/East/West orientation of the base portion 12 provided by the compass system 50 and, based on differences in orientation over pre-determined sampling periods, calculates the current angular velocity of the base portion 12. Based on the determined angular velocity, the microcontroller 52 induces a flashing of the light sources 40 in the selected flash mode.

Figure 6C:
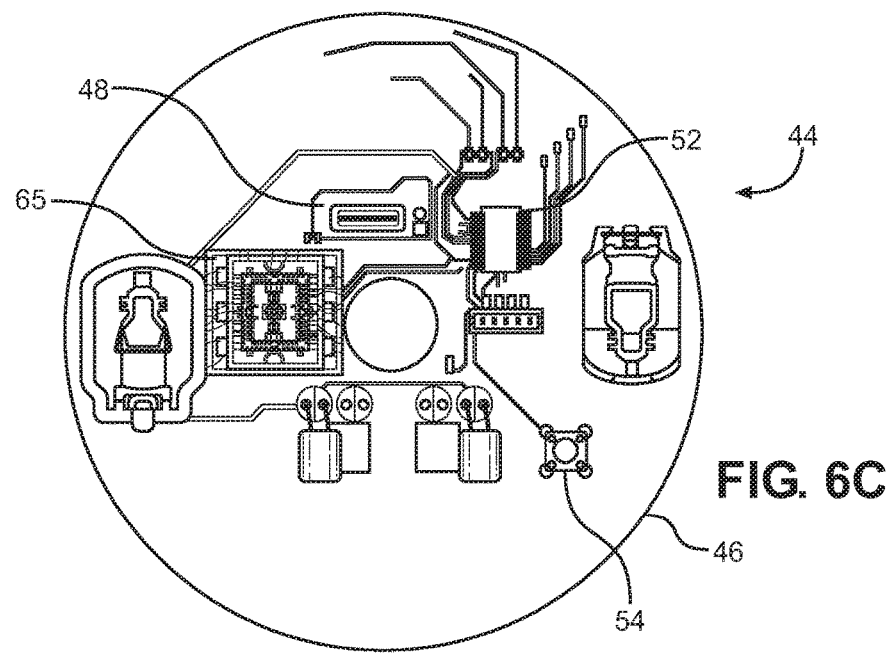
FIG. 6C is a top plan view of an alternative circuit board of an animation device as taught herein.

Alternatively, as is depicted in FIG. 6C, one or more gyroscopes 65, such as a MEMS (microelectromechanical system) gyroscope 65 can operate as a sensor to measure the angular velocity of the base portion 12. The gyroscope 65 is operative as the angular velocity determination system, and the light sources 40 are flashed by the illumination system in the predetermined flash mode dependent on the angular velocity determined by the gyroscope 65. The angular velocity determined by the gyroscope 65 can be updated, such as at predetermined time intervals or continuously, and the illumination of the light sources 40 according to the selected flash mode can be correspondingly revised. The angular velocity output by the gyroscope 65 can, for instance, be sampled by the microcontroller 52 or any other electronic circuitry component or combination of components to permit adjustment of the flashing of the light sources according to the selected flash mode.

Figure 15:
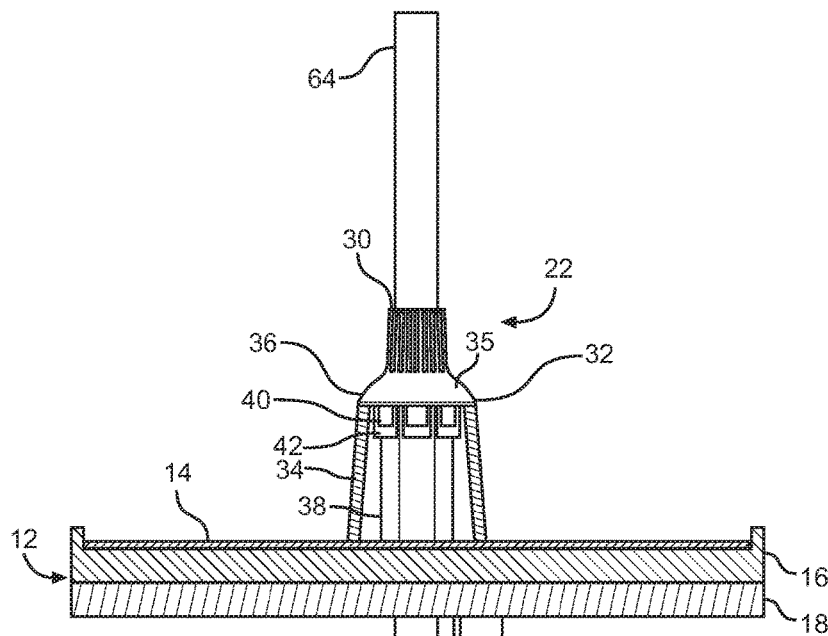
FIG. 15 is a sectional view in side elevation of an alternative animation device according to the invention.

Rather than rotating freely on a support surface (not shown), the base portion 12 could rotate about a non-rotating axis 64 to establish the axis of rotation as FIG. 15 shows. In FIG. 15, the non-rotating axis 64 comprises an elongate rod, but it will be understood and appreciated that other non-rotating axes 64 are possible and within the scope of the invention. In such constructions, the non-rotating axis 64 can be used as a reference to facilitate a determination of the angular velocity of the base portion 12. Stated alternatively, the angular velocity of the base portion 12 can be determined in relation to the non-rotating axis 64 or indeed in relation to another reference point or location. For instance, the base portion 12 can retain a sensor 68 for rotating with the base portion 12, and the non-rotating axis 64 can retain a correspondingly-disposed reference or references 66 to be sensed by the sensor 68 on rotation of the base portion 12 relative to the non-rotating axis 64. Alternatively, the sensor 68 and the reference 66 could be oppositely disposed. Many types of sensors 68 that would be operative to sense relative rotation and to permit a determination of angular velocity based thereon. The sensor 68 could, for example, be an optical sensor, an electro-magnetic sensor, a magnetic sensor, an electric sensor, or any other type of sensor that might now exist or hereafter be developed. In any case, the angular velocity so determined can be sampled by the microcontroller 52 or any other electronic circuitry component or combination of components or otherwise exploited to permit adjustment of the flashing of the light sources according to the selected flash mode.

In each such embodiment, the rotational velocity dependent flashing system thus controls the rate and rhythm of the strobing light sources 40 based on the current rotational velocity of the base portion 12. The rotational velocity dependent flashing system maintains a numerical relationship or flash rate mode between the number of flashes and the number of disk rotations, no matter how fast the base portion 12 is initially rotated and no matter how slow the base portion 12 spins before it comes to a stop. By way of an illustrative example, in one flash mode, the light sources 40 could be flashed six times per one revolution, which can be referred to for convenience as a 6/1 flash mode. Further non-limiting examples are provided hereinbelow. Stopping of the base portion can cause the light sources 40 to be turned off by the electronic circuitry.

The base portion 12 has a flash mode selection mechanism for enabling a selection of a flash mode from among the plurality of flash modes. The flash mode selection mechanism can be a rotary encoder 56. Here, the rotary encoder 56 comprises a rheostat 56 that changes the circuit resistance as upper and lower disks 16 and 18 are relatively pivoted or the flash mode selection mechanism is otherwise operated to control which flash mode from among the plurality of flash modes will be the active flash mode. Another flash mode selection mechanism comprising a rotary encoder 56 could, for example, take the form of an electro-mechanical encoding technique, such as through a plurality of metallic traces disposed to make contact combinations corresponding to the plurality of light source flash modes. Other flash mode selection mechanisms will occur to one knowledgeable in the art after reviewing the present disclosure.

Operation of an embodiment of the animation device 10 could be described summarily as follows. Use can begin by a user's inducing of a rotation of the base portion 12, such as by gripping the knob 30 or actuating an automated rotation system. A rotation of the base portion 12 can automatically turn on the circuitry, such as by the centrifugal switch 48 or otherwise. The orienting system 50 samples the orientation of the base portion 12. The orienting system 50 can, for instance, sample the orientation of the base portion 12 with respect to a reference orientation, such as but not necessarily limited to the Earth's magnetic field, a base that retains the base portion 12, a non-rotating axis for the base portion 12, or another stationary reference orientation. The microcontroller 52 samples the orienting system 50 in fixed time periods and, based on angular differences from sample to sample over time, determines the rotational speed of the base portion 12. The microcontroller 52 samples the flash mode selection mechanism and, based on the selected flash mode and the rotational speed of the base portion 12, the microcontroller 52 generates timed signal pulses to flash the light sources 40.

The animation device 10 can be powered by one or more batteries, such as button cell or any other batteries. The animation device 10 further incorporates an activation mechanism for turning the system on when the device 10 is spinning and turning the system off when the device 10 is at rest. The activation mechanism could, by way of example and not limitation, comprise a centrifugal switch 48, an accelerometer, or another activation mechanism. As FIG. 6B also shows, the several light sources 40 can be coupled to the circuit board 44 by electrical contacts 58 and 60 in combination with wiring 62 that traverses between the light sources 40 and the circuit board 44.

Figure 12:
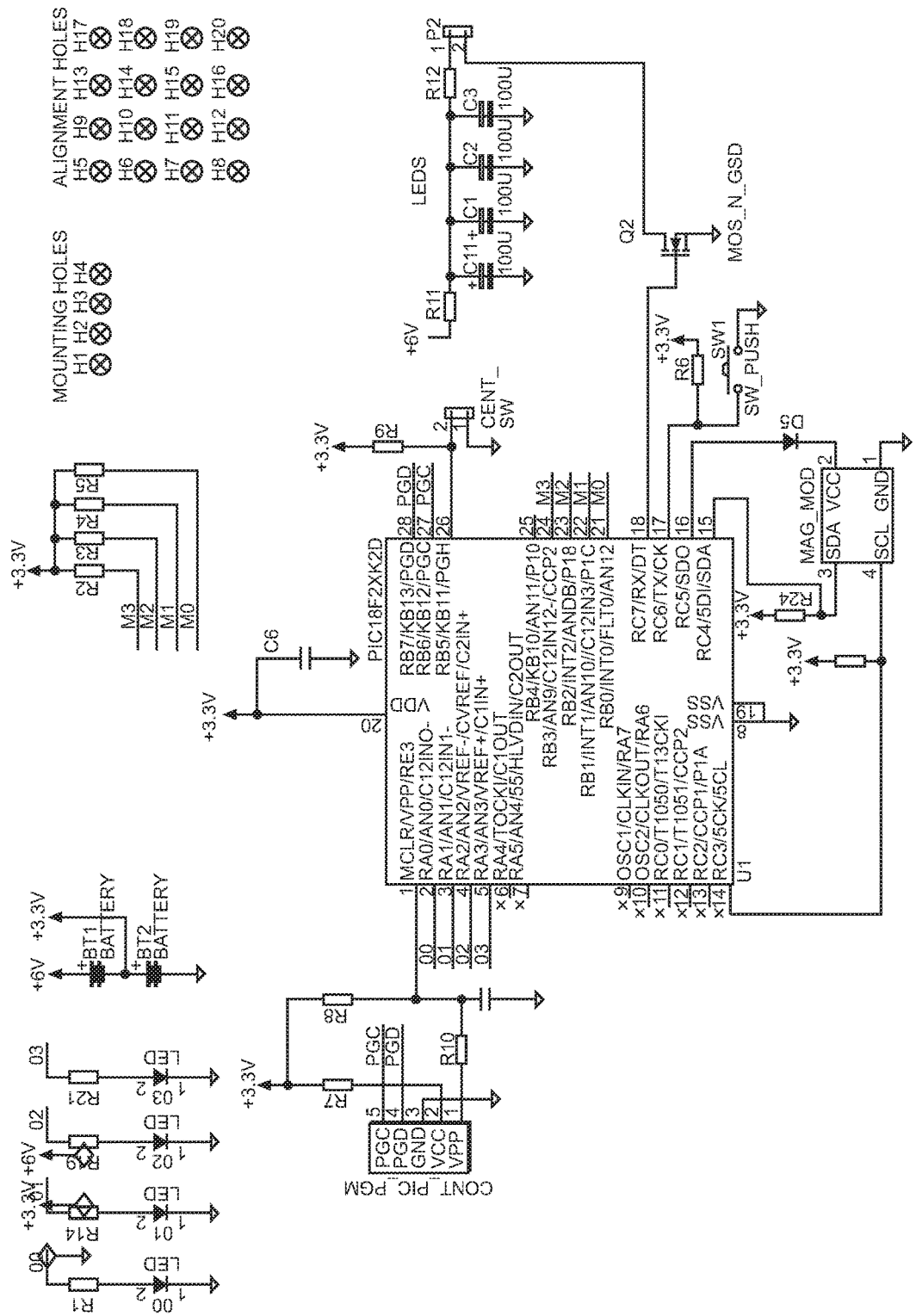
FIGS. 12 and 13 are electrical schematics operable pursuant to the disclosed invention.
Figure 13:
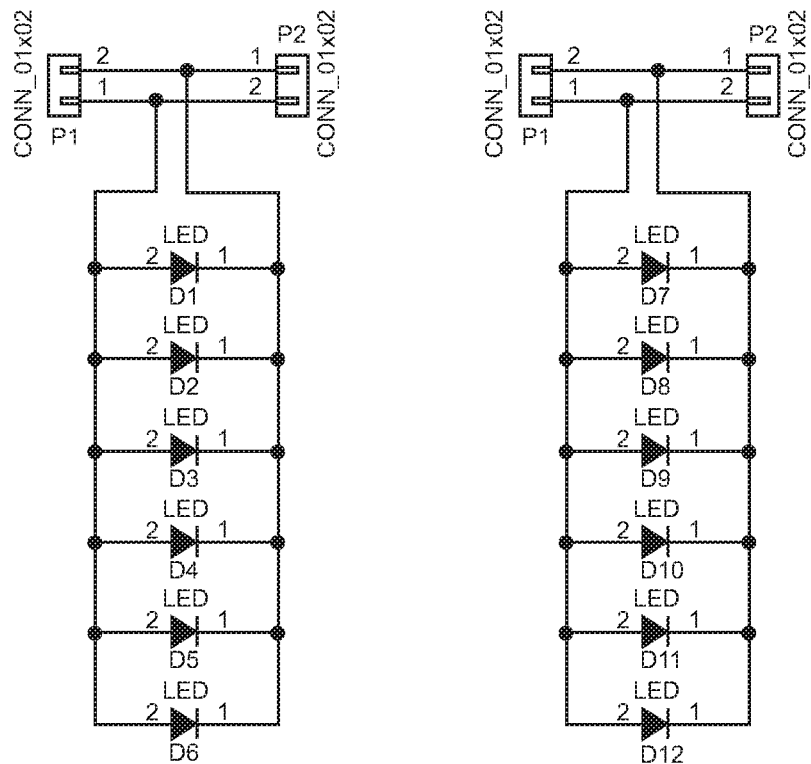

Possible configurations for the electrical circuitry for animation devices 10 as taught herein can be further understood with reference to FIGS. 12 and 13. There, the circuit is constructed and programmed to use the navigational information provided by the compass system 50 and other components of the system to govern the strobe flash rate.

The "on" time for each flash of light should be sufficient to display to an observer a relatively sharp printed image without inducing a distracting blur even when the base portion 12 is spun at relatively high speed, such as at ten revolutions per second or more. It has been determined that, in certain embodiments, a suitable "on" time is from 300-500 microseconds. In practice, different flash rates in the several modes can be determined by the length of the "off" time between each flash.

Figure 14:
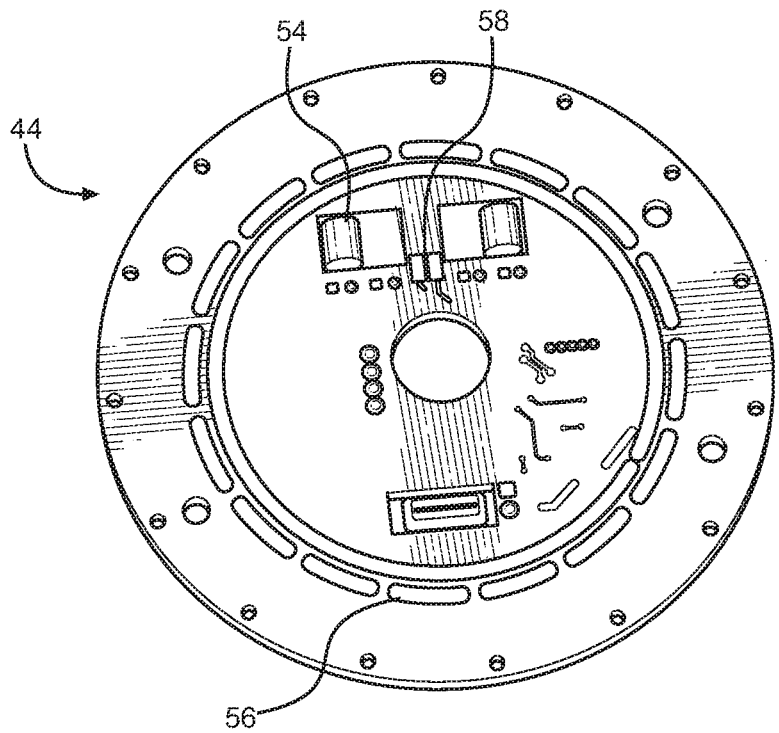
FIG. 14 is a bottom plan view of an alternative circuit board of an animation device according to the invention.

An alternative circuit board 44 pursuant to the invention is depicted in FIG. 14. There, the rotary encoder 56 again relies on an electro-mechanical encoding technique. In this embodiment, however, the rotary encoder 56 has an annular conductive trace divided into sixteen segments with a resistors therebetween. Under this construction, each time a contact traveling along the annular conductive trace passes from one segment to another, a discrete change of resistance is detected thereby providing a clear indication of an adjustment between the several flash modes. The contact could, for instance, project from a lower surface of the upper disk 16 to contact the circuit board 44, which could be retained by the lower disk 18 or vice versa.

The preferred number and kind of strobing light sources 40 employed and their inherent brightness have been chosen carefully to insure that the animations will display clearly under average ambient room light, which otherwise might compete and cause the animating image to blur. It will be understood, of course, that the invention is not limited in this respect except as the claims may expressly require. Referring again to FIGS. 3 and 4, assuming a base portion of approximately 4.25 inches in diameter, the inventors have determined that 6 (six) LEDs of approximately 20 lumens brightness each and an approximately 120 degree of beam spread yields satisfactory illumination. The light sources 40 are evenly-spaced to aim outwardly from within the clear shell 34, such as by being mounted to the central stem 38 with base members 42. The central stem 38 can be faceted. Again with reference to this particular example of the animation device 10 where the base portion 12 has an approximately 4.25 inch diameter, the light sources 40 are positioned approximately 20 millimeters above the surface to be illuminated. Under this configuration, the height of the light sources 40 is approximately 18.5 percent of the diameter of the base portion 12.

Figure 5A:
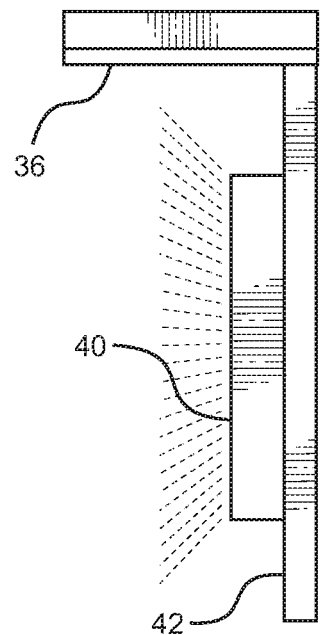
FIG. 5A is a schematic view of a light source configuration.
Figure 5B:
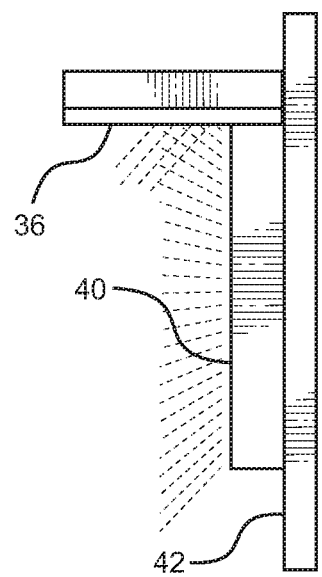
FIG. 5B is a schematic view of a preferred light source configuration.

The hub 22 has a reflective surface 36 disposed above the light sources 40, such as at the base of the dome 35. The reflective surface 36 overhangs the light sources 40 with the light sources 40 being in immediate proximity to the reflective surface 36 as in FIG. 5B rather than spaced therefrom as in FIG. 5A. Again under the exemplary parameters set forth above, it has been found that having the reflective surface 36 overhang the light sources 40 by approximately 3/16 inch produces sufficiently bright and evenly spread illumination on the upper surface of the first disk 16. The overhanging reflective surface 36 and the dome 35 further operate as light shields to protect the user's eyes from direct exposure to the light sources 40.

It is also contemplated that animation of the images 26 could be induced from below. For example, upwardly-directed light sources 40 could be housed beneath a translucent, diffusing surface of the base portion 12. In such a case, the animation disks 14 could be advantageously printed on a clear or frosted substrate, such as acetate, tracing paper, or the another clear or translucent material.

Still further, it would be possible and within the scope of the invention for illumination to be selectively provided to only one area of the surface of the base portion 12 during rotation of the base portion 12. For example, illumination might be selectively provided only to a given quadrant or other portion of the surface leaving the rest of the animation disk 14 without direct illumination. Such an option might be desirable as where distraction could otherwise result from seeing surrounding images on the disk 14. In a well-lit room, for instance, only the chosen area of the disk 14 would animate clearly, while the rest would be an indecipherable blur; in a dark room, only the chosen area of the disk 14, animating clearly, would be visible, and the rest would be dark.

Differently designed animation disks 14 can be interchangeably applied to the upper surface of the base portion 12. The designs on the disks 14 can vary without limit. Some disks 14 could, for instance, contain images of animals or people that appear to come to life and move realistically. Other disks 14 could retain abstract designs that could dance and change patterns in a kaleidoscopic fashion. Where a manually selectable flash mode selection mechanism is provided, such as in the form of the relatively pivotable upper and lower disks 16 and 18 triggering different flash modes, an identification can be provided on the disk 14 to guide in the selection of the flash mode. For instance, where sixteen flash modes are provided as in the exemplary embodiment shown and described herein, an identification code or number from 1 to 16 could applied to each disk 14, such as at or near the perimeter thereof. That identification number can then indicate to the user which number to which to adjust the upper and lower disks 16 and 18 to achieve the desired animation effect.

Consequently, to experience animation of the self-orienting stroboscopic animation device 10, a user could choose an animation disk 14, place the central aperture 28 of the disk 14 over the hub 22, and cause the disk 14 to seat on the flat upper surface of the base portion 12. The flash mode corresponding to the disk 14 can be manually or automatically selected either before or after installation of the disk 14. Manual selection under the depicted embodiment can be achieved, for example, by a relative dialing of the upper and lower disks 16 and 18 of the base portion 12. Where the animation device 10 is manually rotatable, the base portion 12 can then be disposed on a surface, preferably a smooth, flat surface. The user can then grip the knurled knob 30 and spin the base portion 12, typically in a clockwise direction. The spinning automatically activates the light sources 40, which begin flashing according to the selected flash mode. With that, the images 26 applied to the disk 14 are stroboscopically illuminated to bring the otherwise still images 26 to life.

The disclosed self-orienting stroboscopic animation device 10 can produce a wide spectrum of different strobing flash rates and patterns to achieve different animation effects with different disks 14, and sometimes even with the same disk 14. As disclosed herein, designs of animation disks 14 can vary dramatically in the number of radially-arranged images 26 on them, and the flash mode can easily be altered as taught herein to flash accordingly from disk 14 to disk 14. For example, the flash mode might produce 12 flashes per disk revolution for a disk containing 12 image subjects then may quickly be adjusted to flash 16 times per disk revolution for a disk 14 containing 16 image subjects.

Furthermore, the animation device 10 can accommodate instances where the desired animation effect can only be attained through the use of strobe flashing where the strobe flashes are intentionally made to flash at a different rate per revolution than the number of subjects on the disk 14. In this regard, it will be noted that slotted animations are less versatile because the slots, which are usually equivalent in number to the number of subjects, make mandatory the viewing of a single cycle of animation per every single revolution of the disk 14. An adjustable strobe-lit animation device 10 can free the user from this requirement.

Figure 7:
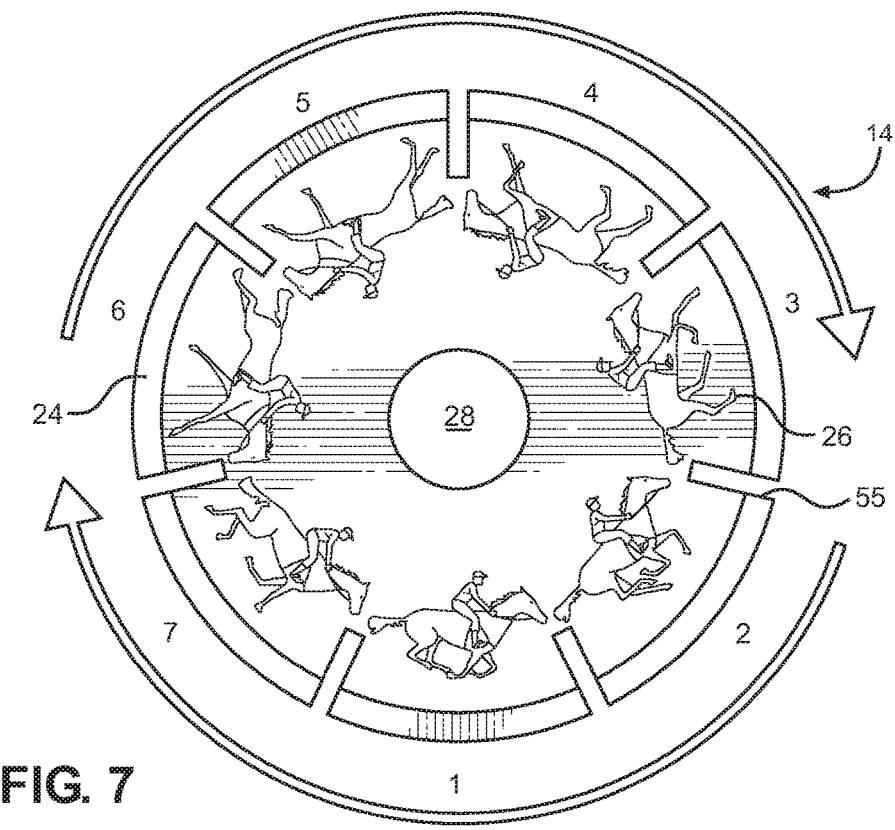
FIG. 7 is a top plan view of a slotted animation disk.

A further understanding of slotted animations can be had with additional reference to FIG. 7. There, a slotted animation disk 14 is depicted in which seven images 26 of a galloping horse are arranged in sequence. The images 26 are radially arranged at equal intervals around the body 24 of the disk 14, and viewing slots 55 are placed at an equal distance between each horse image 26. When the disk 14 is rotated clockwise, and the observer looks through the whirling slots 55 into a mirror, the horse images 26 will animate, completing one full gallop cycle per each revolution of the disk 14.

However, regardless of whether slots 55 or strobe lights 40 are employed, the conventional one-animation-cycle-per-one-disk revolution arrangement of images 26 shown in FIG. 7 is not always preferable, especially when the rate of rotational speed of the disk 14 cannot be governed, and when it is rotating too fast in particular. The subject, particularly if it is representing one found in nature, must be made to animate with believable rhythm and cadence to have maximum visual impact. For example, in nature, we might expect a race horse to gallop at a rate of speed of approximately three gallops per second. If one were to observe an animation of a horse that is galloping twice as fast as that, the animation would appear to be less convincing or even comical, and would lose its believability and so its visual impact.

A manually-rotated animation device 10 presents this exact problem because, when the average user naturally hand-spins the base portion 12, the initial rotational speed of the whirling base portion 12 will often be six rotations per second or even faster. At this rapid rate of spin, the consecutively-arranged horse images 26 of FIG. 7 will appear to gallop at least twice as fast as they should. With time, the base portion 12 will slow, and the horse images 26 will reach a more natural cadence. However, one cannot rely on the patience of the user to wait for this to happen, nor can one necessarily guide the user in spinning the base portion 12 at a slower initial rotational speed. It would thus be preferable if, immediately after the base portion 12 is manually spun at the rate of six or more revolutions per second, the horse nonetheless appeared to gallop with a realistic cadence.

Recognizing such issues, the inventors have conceived that, rather than a disk 14 that rotates once to complete a full animation cycle, a disk 14 can be created that rotates multiple times, such as twice, to complete one full animation cycle. While this is problematic with a slotted animation disk 14 with images 26 disposed in sequence as in FIG. 7, it can be accomplished with an adjustable strobe light system according to the invention if the images 26, which of course could be horses or any other image 26, are redistributed radially in a staggered manner and the light sources 40 flashed to illuminate sequential images. For instance, with the staggered disposition of FIG. 8 where sequential images 26 of a first group of images 26 have sequential images of a second group of images 26 and perhaps additional groups of sequential images interposed therebetween, the light sources 40 can then be flashed once per 102.8571 degrees of rotation of the disk 14. This combined staggering and flash rate effectively skips every other image 26 as the disk 14 whirls around. With that, the initial group of images 26, namely images 1, 2, 3, and 4, are illuminated in sequence in a given rotational position followed by an illumination of the secondary group of images 26, namely images 5, 6, and 7. The disk 14 must now complete two full revolutions for the animating images 26, here numbered 1, 2, 3, 4, 5, 6, and 7 but disposed as images 1, 5, 2, 6, 3, 7, 4, to complete one full animation cycle. Accordingly, when the base portion 12 is manually rotated by the user at, for example, six rotations per second, the illustrative images 26 of the horse now appear to gallop at the natural cadence of three gallops per second despite the high rotational speed of the disk 14.

The foregoing is just one example of the versatility of the disclosed strobe light animation system 10 over slotted strobe systems of the prior art. Image staggering and corresponding flash modes can also be employed not only to skip every other image, but also to skip two or more images at a time. Accordingly, again by way of example and not limitation, first, second, and third interposed groups of images 26 could be disposed on the disk 14. With correspondingly timed illumination, the disk 14 could rotate three times or more to complete a single animation cycle with the first, second, and third interposed groups of images 26 illuminated with the first group of images 26 illuminated, then the second group of images 26 illuminated, and then the third group of images 26 illuminated.

Figure 10:
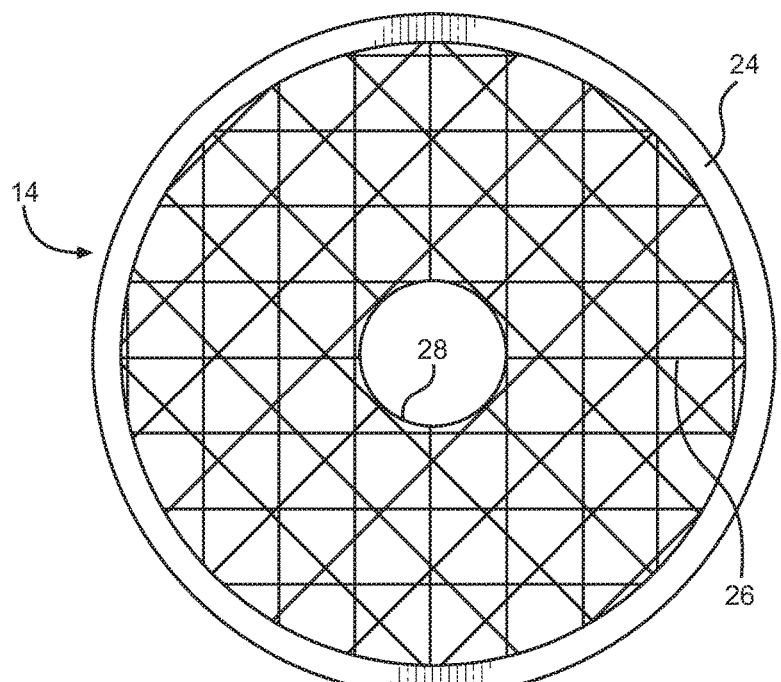
FIG. 10 is a top plan view of the animation disk of FIG. 9 in a stage of animation.
Figure 11:
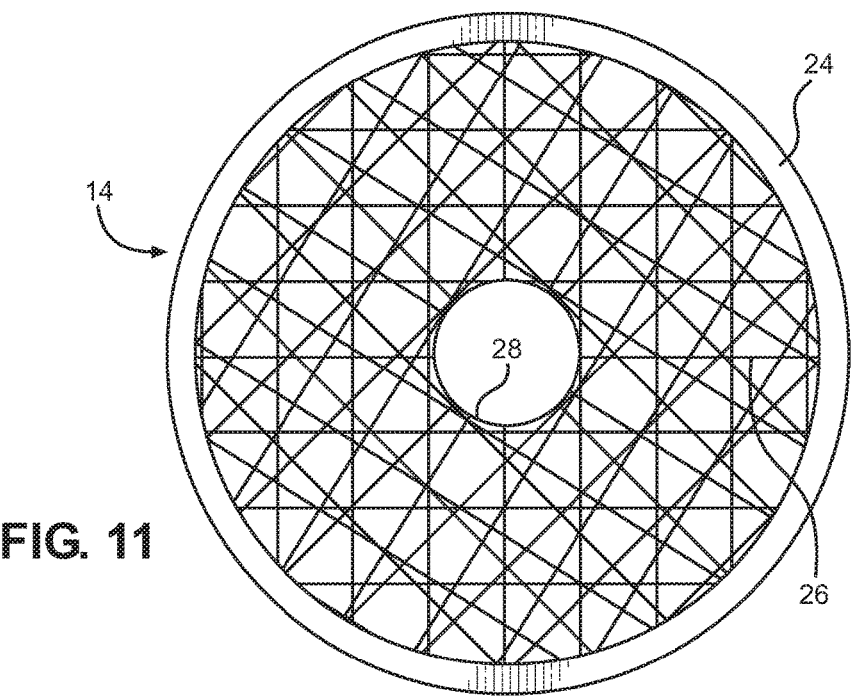
FIG. 11 is a top plan view of the animation disk of FIG. 9 in a further stage of animation.

Also within the scope of the invention, flashing strobe light sources 40 can be programmed to have a flashing rhythm as the animation disk 14 whirls that produces different effects or pleasing, kaleidoscopically-transforming patterns. For example, in FIG. 9, an animation disk 14 is printed with an image 26 of a simple black and white graph. Regardless of the speed at which the disk 14 is spun, if the strobe lights 40 are made to flash four times per revolution, the exact same graph image 26 will appear, frozen in place, even though the disk 14 is spinning at a varying rate. Now, while the disk 14 is still spinning, if the strobe lights 40 are made to flash eight times per revolution, the image 26 instantly transforms into that shown in FIG. 10 below. Then, while the disk 14 is still spinning, the strobe light sources 40 can be made to flash at the rate of six times per revolution thereby transforming the image 26 again as shown in FIG. 11. By varying the rate of strobe light flash further, even more complex patterns can be attained. Not only stationary patterns can be displayed, but also patterns that rotate in one direction or the other or even with two gridded patterns of the same disk 14 appearing to rotating against one another.

As described above, embodiments of the self-orienting stroboscopic animation device 10 have plural flash modes, which can be manually or automatically selectable. One presently contemplated embodiment of the device 10 has sixteen manually selectable flash modes, although fewer or more flash modes may be provided. By way of illustrative example and not limitation, one mode may flash at six times per disk revolution, another at twelve times per disk revolution, and yet another at sixteen times per disk revolution. Still another may flash, for example, at seven times per two disk revolutions as suggested in FIG. 8, and another may flash at thirteen times per every three disk revolutions. Of course, numerous further permutations are possible. Another flash mode can exhibit a constantly-changing flash rate that will deliver results that vary over time to display different animations, such as the animations depicted in FIGS. 9, 10, and 11, for example. As disclosed herein, the flash rate modes can maintain a numerical relationship between the number of flashes and the number of disk rotations, no matter how fast the base portion 12 is initially rotated and no matter how slow the base portion 12 spins before it comes to a stop, which can turn the light sources 40 off.

While again noting that the number and details of the multiple flash modes could vary within the scope of the invention as could the flash mode selection mechanism, sixteen (16) different flash modes contemplated in one embodiment of the invention are described below to ensure a full understanding of the invention. In a first flash mode, as would be selected by adjusting the upper disk 16 relative to the lower disk 18 so that the indicator 15 aligns with the number "1" position marker 20, the light sources 40 could be flashed six times per one revolution, which can be referred to for convenience as a 6/1 flash mode. This 6/1 first flash mode has been found, by way of example and not limitation, to cause a six-phase horse to gallop in place. A second flash mode, demarcated by the number "2" position marker 20, is a 13/2 flash mode where thirteen flashes are actuated for every two revolutions. This mode has been found to make the same six-phase horse seem to progress forward in a counter-clockwise direction around the disk while galloping, assuming rotation in a clockwise direction, although such need not necessarily be the case. Again, an identification 70 can be disposed on the animation disk 14, such as on the underside thereof as is depicted in FIG. 16, to indicate the flash mode under which the animation disk 14 is designed to be animated.

Using the same "number of flashes"/"numbers of revolutions" format, further non-limiting examples of the infinite possibilities for selectable flash modes are as follows:

Third Flash Mode: 12/1, which would, for example, cause an illustration of a twelve-phase running figure to run in place;

Fourth Flash Mode: 25/2, which would, for example, make the same twelve-phase running figure progress forward in a counter-clockwise direction around the disk while running;

Fifth Flash Mode: 7/2, which, for example, can be employed to cause seven-phase staggered subjects to animate in place;

Sixth Flash Mode: 15/4, which can be employed to cause the same seven-phase subjects referenced above to progress forward in a counter-clockwise direction;

Seventh Flash Mode: 9/1, which causes, for example, rotating flower wheels and other classic phenakistascope animations and patterns to rotate and animate;

Eighth Flash Mode: 10/1, which can, for example, be employed to induce alternative phenakistascope animations;

Ninth Flash Mode: 13/1, which can be used, for instance, to produce radiating arrows and other moiré patterns;

Tenth Flash Mode: 16/1, under which the animation device 10 has been used to produce moving toy soldiers, bears, a screaming Mona Lisa, flowers opening, and other animations;

Eleventh Flash Mode: 9/2, which has been used to show exploding fireworks;

Twelfth Flash Mode: 11/2, which has been used to produce animation of a girl on a swing;

Thirteenth Flash Mode: 13/2, which has been used to produce slower animations of twelve and fourteen phase animations;

Fourteenth Flash Mode: A flash rate changing periodically, such as once per second, for geometrical and other designs, such as between 4/1, 8/1, 5/1, 6/1, 7/1, 9/1, 10/1, 11/1, 13/1, and 14/1 flash mode patterns;

Fifteenth Flash Mode: A flash rate changing periodically, such as once per second, usable for spiral dots and other designs, such as between 4/1, 5/1, 7/1, 10/1, 19/1, and 22/1 patterns; and Sixteenth Flash Mode: A constant flash rate, such as 100 flashes per second, regardless of the rotational speed of the base portion 12 through disengaged reliance on orientation system 50, to produce changing abstract patterns and their direction and speed of animation. This and other flash modes could operate independently of rotational speed.

Where an orienting system 50, such as a compass system 50, is employed that can be affected by magnetic forces, a further, unexpected method for using the animation device 10 has been discovered by the inventors. In particular, it has been found that, by holding a magnet near the whirling, strobing base portion 12, a user can affect the operation of the animation 10 by affecting the normal operation of the orienting system 50. A user can thus disrupt the programmed flash rate and create unusual animation effects and, in the case of abstract graphics, unpredictable pattern changes. Further, if the user draws the magnet in a slow, close circle around the whirling base portion 12, the animated images 26, which ordinarily would animate in place, have been found to follow the magnet circumferentially around the spinning base portion 12. The inventors continue to develop their understanding of the precise phenomenon that is occurring and how it may be further controlled and manipulated, but it is clear that the resulting animation effects are entertaining and add substantial play value to the animation device 10.

It will again be understood that, although the animation device 10 is primarily shown and described herein as being manually rotatable, the animation device 10 could be motorized to produce automatic rather than manual rotation. For example, where the animation device 10 is actuated to an on condition, the animation device 10 could be driven by an automated rotation system, such as an internal oscillator, to self-spin. The base portion 12 of the animation device 10 could spin continuously through the life of a battery driving the oscillator. In such embodiments, the oscillator can comprise an off-center vibrator retained by the base portion 12. Alternatively, the base portion 12 could be turned by an external motor. Other powered automated rotation systems will become obvious to one skilled in the art after reading the present disclosure and should be considered within the scope of the invention except as it may be expressly limited by the claims.

Operation of an embodiment of the animation device 10 could be described summarily as follows. Use can begin by a user's inducing of a rotation of the base portion 12, such as by gripping the knob 30 or actuating an automated rotation system. A rotation of the base portion 12 can automatically turn on the circuitry, such as by the centrifugal switch 48 or otherwise. The orienting system 50 samples the orientation of the base portion 12. The orienting system 50 can, for instance, sample the orientation of the base portion 12 with respect to a reference orientation, such as but not necessarily limited to the Earth's magnetic field, a base that retains the base portion 12, a fixed axis for the base portion 12, or another stationary reference orientation. The microcontroller 52 samples the orienting system 50 in fixed time periods and, based on angular differences from sample to sample over time, determines the rotational speed of the base portion 12. The microcontroller 52 samples the flash mode selection mechanism and, based on the selected flash mode and the rotational speed of the base portion 12, the microcontroller 52 generates timed signal pulses to flash the light sources 40.

In certain embodiments, for example, the light sources 40 can be flashed at the selected flash rate with flash pulses of 300 microseconds long to maintain sharp images. It has been found that LED light sources 40 can be driven in excess of their rated current, such as at ten times their rated current, in view of the short pulse times and the intervals between pulses, which has been found to produce higher light source intensity. One or more capacitors 54 can be used to gather enough charge to supply extra power to the light sources 40 as necessary.

With certain details and embodiments of the present invention for a self-orienting stroboscopic animation device 10 disclosed, it will be appreciated by one skilled in the art that numerous changes and additions could be made thereto without deviating from the spirit or scope of the invention. This is particularly true when one bears in mind that the presently preferred embodiments merely exemplify the broader invention revealed herein. Accordingly, it will be clear that those with major features of the invention in mind could craft embodiments that incorporate those major features while not incorporating all of the features included in the preferred embodiments.

Therefore, the following claims shall be considered to define the scope of protection to be afforded to the inventors. Those claims shall be deemed to include equivalent constructions insofar as they do not depart from the spirit and scope of the invention. It must be further noted that a plurality of the following claims may express, or be interpreted to express, certain elements as means for performing a specific function, at times without the recital of structure or material. As the law demands, any such claims shall be construed to cover not only the corresponding structure and material expressly described in this specification but also all equivalents thereof, including those that already exist or that may hereafter be developed.

We claim as deserving the protection of Letters Patent:

1. A rotatable stroboscopic animation device comprising:
   a rotatable base portion wherein the base portion is rotatable at an angular velocity;
   at least one light source retained to illuminate the base portion; and
   an angular velocity dependent flashing system for flashing the at least one light source according to a predetermined flash mode of the at least one light source dependent on the angular velocity of the base portion;
   wherein the angular velocity dependent flashing system comprises an angular velocity determination system and an illumination system that cooperate to flash the at least one light source in the predetermined flash mode dependent on the angular velocity determined by the angular velocity determination system and wherein the angular velocity determination system comprises an orienting system in combination with a sampling system.

2. The rotatable stroboscopic animation device of claim 1 wherein the orienting system is operative to provide orientational indications regarding the orientation of the base portion and wherein the sampling system is operative to sample orientational indications from the orienting system periodically and, based on periodically-obtained orientational indications, to determine the angular velocity of the base portion.

3. The rotatable stroboscopic animation device of claim 2 wherein the sampling system comprises a microcontroller.

4. The rotatable stroboscopic animation device of claim 2 wherein the orienting system comprises a compass operative to provide orientational indications of North/South/East/West orientation of the base portion and wherein the sampling system calculates the angular velocity of the base portion based on differences in the orientational indications provided by the orienting system over pre-determined sampling periods.

5. The rotatable stroboscopic animation device of claim 1 wherein the base portion has a concentric protuberance and wherein the base portion is rotatable on the concentric protuberance.

6. The rotatable stroboscopic animation device of claim 1 wherein the angular velocity determination system comprises a gyroscope.

7. The rotatable stroboscopic animation device of claim 1 further comprising an axis member wherein the base portion is rotatable about the axis member.

8. The rotatable stroboscopic animation device of claim 7 wherein the angular velocity determination system determines the angular velocity of the base portion in relation to the axis member.

9. The rotatable stroboscopic animation device of claim 8 wherein the angular velocity determination system comprises a sensor retained by the base portion or the axis member and a reference for being sensed by the sensor retained by the other of the base portion and the axis member.

10. The rotatable stroboscopic animation device of claim 1 wherein the flash mode comprises a predetermined number of flashes of the at least one light source corresponding to a predetermined number of rotations of the base portion.

11. The rotatable stroboscopic animation device of claim 1 further comprising a flash mode selection mechanism for selecting a flash mode of the at least one light source from among a plurality of flash modes.

12. The rotatable stroboscopic animation device of claim 11 wherein the flash mode selection mechanism comprises a rotary encoder.

13. The rotatable stroboscopic animation device of claim 11 wherein the flash mode selection mechanism comprises a manual flash mode selection mechanism.

14. The rotatable stroboscopic animation device of claim 1 further comprising a hub retained by the base portion to rotate with the base portion wherein the hub projects concentrically from the base portion and wherein the at least one light source is retained by the hub.

15. The rotatable stroboscopic animation device of claim 14 further comprising an opaque dome retained by a distal portion of the hub.

16. The rotatable stroboscopic animation device of claim 15 wherein the at least one light source is retained in juxtaposition with the dome.

17. The rotatable stroboscopic animation device of claim 1 further comprising an animation member with a plurality of images thereon for being selectively retained to rotate with the base portion.

18. The rotatable stroboscopic animation device of claim 17 further comprising an indication retained by the animation member of a flash mode for animation of the animation disk.

19. The rotatable stroboscopic animation device of claim 17 wherein the plurality of images are staggered with plural sequential images of a second group of images interposed with plural sequential images of a first group of images.

20. The rotatable stroboscopic animation device of claim 1 wherein the at least one light source is retained by the rotatable base portion to rotate with the rotatable base portion.

21. The rotatable stroboscopic animation device of claim 1 wherein the angular velocity dependent flashing system automatically flashes the at least one light source according to the predetermined flash mode during rotation of the base portion.

22. The rotatable stroboscopic animation device of claim 1 wherein the angular velocity dependent flashing system comprises an angular velocity determination system and an illumination system that cooperate to flash the at least one light source in the predetermined flash mode dependent on the angular velocity determined by the angular velocity determination system.

23. The rotatable stroboscopic animation device of claim 22 wherein the angular velocity determination system comprise an orienting system in combination with a sampling system wherein the orienting system is operative to provide orientational indications regarding the orientation of the base portion and wherein the sampling system is operative to sample orientational indications from the orienting system periodically and, based on periodically-obtained orientational indications, to determine the angular velocity of the base portion.

24. The rotatable stroboscopic animation device of claim 22 wherein the orienting system comprises a compass operative to provide orientational indications of North/South/East/West orientation of the base portion and wherein the sampling system calculates the angular velocity of the base portion based on differences in the orientational indications provided by the orienting system over pre-determined sampling periods.

25. The rotatable stroboscopic animation device of claim 1 further comprising an axis member wherein the base portion is rotatable about the axis member and wherein the angular velocity determination system determines the angular velocity of the base portion in relation to the axis member.

26. The rotatable stroboscopic animation device of claim 1 further comprising a flash mode selection mechanism, wherein the flash mode selection mechanism comprises a rotary encoder, wherein the base portion has an upper disk and a lower disk, wherein the upper disk and the lower disk are relatively pivotable, and wherein the rotary encoder is operable by a relative pivoting between the upper disk and the lower disk.

27. A rotatable stroboscopic animation device comprising:
a rotatable base portion wherein the base portion is rotatable at an angular velocity;
at least one light source retained to illuminate the base portion;
an angular velocity dependent flashing system for flashing the at least one light source according to a predetermined flash mode of the at least one light source dependent on the angular velocity of the base portion;
a flash mode selection mechanism for selecting a flash mode of the at least one light source from among a plurality of flash modes wherein the flash mode selection mechanism comprises a manual flash mode selection mechanism, wherein the base portion has an upper disk and a lower disk, wherein the upper disk and the lower disk are relatively pivotable, and wherein the flash mode selection mechanism is operable by a relative pivoting between the upper disk and the lower disk.

28. The rotatable stroboscopic animation device of claim 17 wherein the angular velocity dependent flashing system has a plurality of different, predetermined flash modes and further comprising a flash mode selection mechanism for selecting a predetermined flash mode from among the plurality of different, predetermined flash modes.

29. The rotatable stroboscopic animation device of claim 28 wherein each predetermined flash mode comprises a predetermined number of flashes of the at least one light source corresponding to a predetermined number of rotations of the base portion.

30. The rotatable stroboscopic animation device of claim 27 wherein the at least one light source is retained by the rotatable base portion to rotate with the rotatable base portion.

31. The rotatable stroboscopic animation device of claim 27 wherein the angular velocity dependent flashing system automatically flashes the at least one light source according to the predetermined flash mode during rotation of the base portion.

32. The rotatable stroboscopic animation device of claim 27 wherein the angular velocity dependent flashing system comprises an angular velocity determination system and an illumination system that cooperate to flash the at least one light source in the predetermined flash mode dependent on the angular velocity determined by the angular velocity determination system.

33. The rotatable stroboscopic animation device of claim 32 wherein the angular velocity determination system comprise an orienting system in combination with a sampling system wherein the orienting system is operative to provide orientational indications regarding the orientation of the base portion and wherein the sampling system is operative to sample orientational indications from the orienting system periodically and, based on periodically-obtained orientational indications, to determine the angular velocity of the base portion.

34. The rotatable stroboscopic animation device of claim 32 wherein the orienting system comprises a compass operative to provide orientational indications of North/South/East/West orientation of the base portion and wherein the sampling system calculates the angular velocity of the base portion based on differences in the orientational indications provided by the orienting system over pre-determined sampling periods.

35. The rotatable stroboscopic animation device of claim 27 further comprising an axis member wherein the base portion is rotatable about the axis member and wherein the angular velocity determination system determines the angular velocity of the base portion in relation to the axis member.

36. The rotatable stroboscopic animation device of claim 27 wherein the base portion has a concentric protuberance and wherein the base portion is rotatable on the concentric protuberance.

37. A rotatable stroboscopic animation device comprising:
a rotatable base portion wherein the base portion is rotatable at an angular velocity;
at least one light source retained by the rotatable base portion to rotate with the rotatable base portion to illuminate the rotatable base portion;
a flashing system for flashing the at least one light source according to a predetermined flash mode of the plurality of light sources; and
a flash mode selection mechanism for selecting a predetermined flash mode of the at least one light source from among a plurality of predetermined flash modes;
wherein the flash mode selection mechanism comprises a manual flash mode selection mechanism wherein the base portion has an upper disk and a lower disk, wherein the upper disk and the lower disk are relatively pivotable, and wherein the flash mode selection mechanism is operable by a relative pivoting between the upper disk and the lower disk.

38. The rotatable stroboscopic animation device of claim 37 wherein the flash mode selection mechanism comprises a rotary encoder.

39. The rotatable stroboscopic animation device of claim 37 further comprising an animation member with a plurality of images thereon for being selectively retained to rotate with the base portion.

40. The rotatable stroboscopic animation device of claim 39 further comprising an indication retained by the animation member of a predetermined flash mode for animation of the animation member.

41. The rotatable stroboscopic animation device of claim 37 wherein each predetermined flash mode comprises a predetermined number of flashes of the at least one light source corresponding to a predetermined number of rotations of the base portion.

42. The rotatable stroboscopic animation device of claim 37 wherein the flashing system comprises an angular velocity dependent flashing system for flashing the at least one light source according to the predetermined flash mode of the at least one light source dependent on the angular velocity of the base portion.

43. The rotatable stroboscopic animation device of claim 42 wherein the angular velocity dependent flashing system comprises an angular velocity determination system and an illumination system that cooperate to flash the at least one light source in the predetermined flash mode dependent on the angular velocity determined by the angular velocity determination system.

44. The rotatable stroboscopic animation device of claim 43 wherein the angular velocity determination system comprise an orienting system in combination with a sampling system.

45. The rotatable stroboscopic animation device of claim 44 wherein the orienting system is operative to provide orientational indications regarding the orientation of the base portion and wherein the sampling system is operative to sample orientational indications from the orienting system periodically and, based on periodically-obtained orientational indications, to determine the angular velocity of the base portion.

46. The rotatable stroboscopic animation device of claim 45 wherein the sampling system comprises a microcontroller.

47. The rotatable stroboscopic animation device of claim 45 wherein the orienting system comprises a compass operative to provide orientational indications of North/South/East/West orientation of the base portion and wherein the sampling system calculates the angular velocity of the base portion based on differences in the orientational indications provided by the orienting system over pre-determined sampling periods.

48. The rotatable stroboscopic animation device of claim 43 further comprising an axis member wherein the base portion is rotatable about the axis member.

49. The rotatable stroboscopic animation device of claim 48 wherein the angular velocity determination system determines the angular velocity of the base portion in relation to the axis member.

50. The rotatable stroboscopic animation device of claim 49 wherein the angular velocity determination system comprises a sensor retained by the base portion or the axis member and a reference for being sensed by the sensor retained by the other of the base portion and the axis member.

51. The rotatable stroboscopic animation device of claim 37 wherein the base portion has a concentric protuberance and wherein the base portion is rotatable on the concentric protuberance.

* * * * *